US012675526B2

(12) United States Patent　　(10) Patent No.:　US 12,675,526 B2
Liu et al.　　(45) Date of Patent:　　Jul. 7, 2026

(54) METHOD, DEVICE, STORAGE MEDIUM AND PROGRAM PRODUCT FOR MUSIC SCREENING

(71) Applicant: LEMON INC., Grand Cayman (KY)

(72) Inventors: Ding Liu, Los Angeles, CA (US); Xiaojie Jin, Los Angeles, CA (US); Yan Wang, Beijing (CN); Weibo Gong, Beijing (CN)

(73) Assignee: LEMON INC., Grand Cayman (KY)

( * ) Notice: Subject to any disclaimer, the term of this patent is extended or adjusted under 35 U.S.C. 154(b) by 29 days.

(21) Appl. No.: 18/570,310

(22) PCT Filed: May 10, 2022

(86) PCT No.: PCT/SG2022/050298
§ 371 (c)(1),
(2) Date: Dec. 14, 2023

(87) PCT Pub. No.: WO2023/009057
PCT Pub. Date: Feb. 2, 2023

(65) Prior Publication Data
US 2024/0241907 A1　　Jul. 18, 2024

(30) Foreign Application Priority Data

Jul. 26, 2021　(CN) .......................... 202110843309.7

(51) Int. Cl.
*G06F 16/60*　　(2019.01)
*G06F 16/55*　　(2019.01)
(Continued)

(52) U.S. Cl.
CPC .............. *G06F 16/68* (2019.01); *G06F 16/55* (2019.01); *G06F 16/65* (2019.01)

(58) Field of Classification Search
CPC .......... G06F 16/68; G06F 16/55; G06F 16/65; G06F 16/48; G06F 16/632; G06F 16/683; G10L 25/63; H04N 21/439; G06V 10/764
See application file for complete search history.

(56) References Cited

U.S. PATENT DOCUMENTS 10,140,515 B1 *　11/2018　Waldo ................... G06F 16/639
10,489,450 B1 *　11/2019　Lothian ................. G06F 16/636
(Continued)

FOREIGN PATENT DOCUMENTS

CN　　110866184 A　　3/2020
CN　　111031391 A　　4/2020
(Continued)

OTHER PUBLICATIONS

Article entitled "Photosense: Make Sense of Your Photos with Enriched Harmonic Music via Emotion Association", by Su et al., dated 2011 (Year: 2011).*
(Continued)

*Primary Examiner* — Mahesh H Dwivedi
(74) *Attorney, Agent, or Firm* — Astute IP Law Group

(57) ABSTRACT

Embodiments of the disclosure provide a method, device, storage medium and program product for music screening. The method includes: obtaining at least one image and at least one piece of to-be-selected music; determining an analysis result of the at least one image corresponding to an image classification tag based on N predetermined image classification tags, N being an integer greater than or equal to 1; determining attribute information for each piece of to-be-selected music based on the at least one image and the at least one piece of to-be-selected music; determining target music that matches the at least one image among the at least
(Continued)

one piece of to-be-selected music based on the analysis result and the attribute information of each piece of to-be-selected music.

16 Claims, 5 Drawing Sheets

(51) Int. Cl.
*G06F 16/65* (2019.01)
*G06F 16/68* (2019.01)

(56) References Cited

U.S. PATENT DOCUMENTS

| | | | | |
|---|---|---|---|---|
| 2008/0256100 | A1* | 10/2008 | van de Sluis | G06F 16/639 |
| | | | | 707/E17.103 |
| 2011/0288929 | A1* | 11/2011 | Mei | G06F 16/4393 |
| | | | | 707/E17.084 |
| 2016/0004699 | A1* | 1/2016 | Liu | G06F 16/9535 |
| | | | | 707/734 |
| 2018/0226063 | A1* | 8/2018 | Wood | G11B 27/031 |
| 2020/0073885 | A1* | 3/2020 | Baijal | G06F 16/7844 |
| 2020/0410298 | A1* | 12/2020 | Murali | G06N 3/08 |
| 2021/0004402 | A1* | 1/2021 | Li | G11B 27/11 |
| 2022/0147558 | A1* | 5/2022 | Steffensen | G11B 27/28 |

FOREIGN PATENT DOCUMENTS

| | | |
|---|---|---|
| CN | 111198958 A | 5/2020 |
| CN | 111259192 A | 6/2020 |
| CN | 111753126 A | 10/2020 |
| CN | 111767431 A | 10/2020 |

OTHER PUBLICATIONS

International Search Report and Written Opinion, International Patent Application No. PCT/SG2022/050298, Aug. 10, 2022, wit English translation of Search Report (12 pages).

* cited by examiner

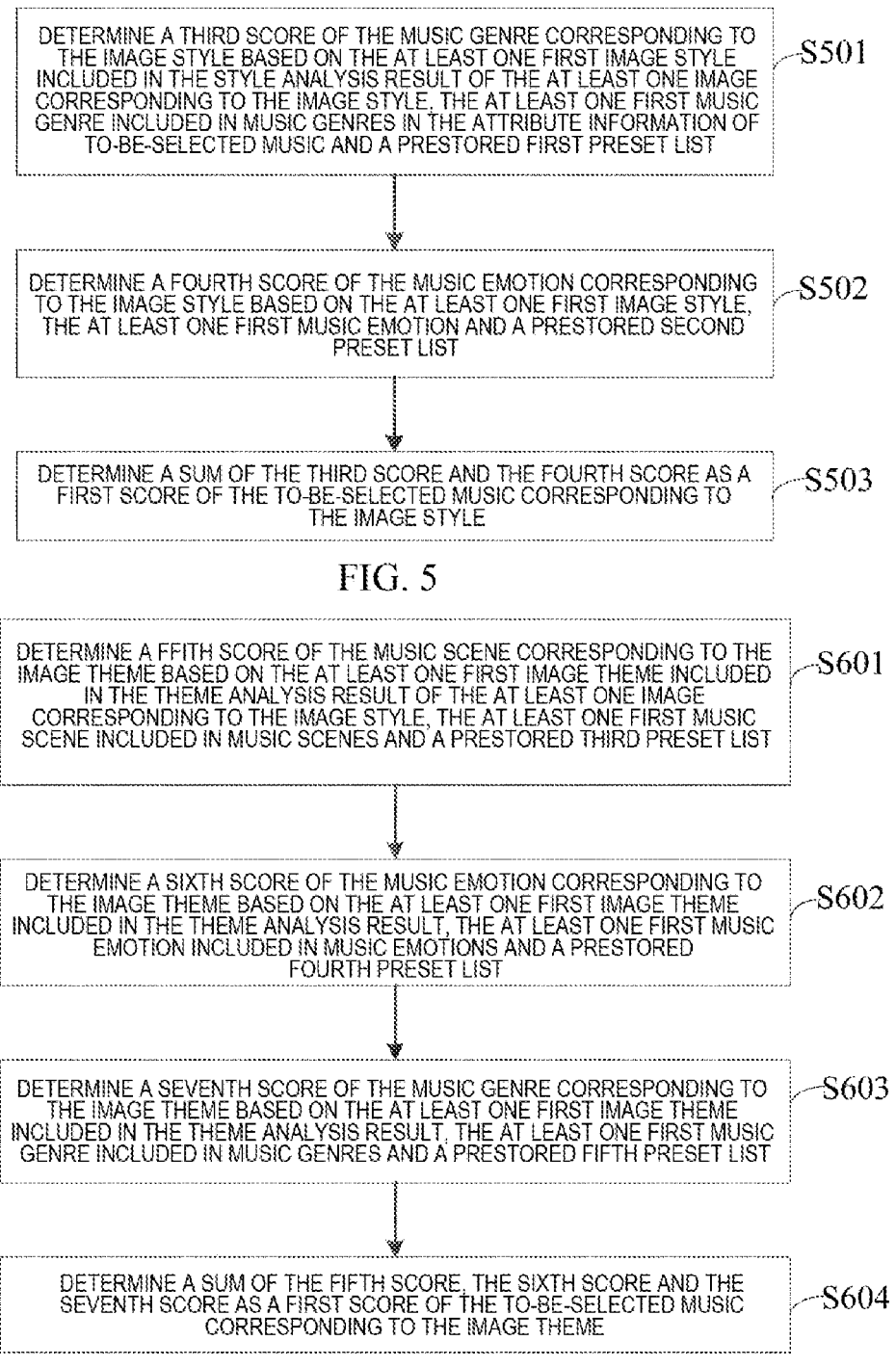

DETERMINE A THIRD SCORE OF THE MUSIC GENRE CORRESPONDING TO THE IMAGE STYLE BASED ON THE AT LEAST ONE FIRST IMAGE STYLE INCLUDED IN THE STYLE ANALYSIS RESULT OF THE AT LEAST ONE IMAGE CORRESPONDING TO THE IMAGE STYLE, THE AT LEAST ONE FIRST MUSIC GENRE INCLUDED IN MUSIC GENRES IN THE ATTRIBUTE INFORMATION OF TO-BE-SELECTED MUSIC AND A PRESTORED FIRST PRESET LIST ~S501

DETERMINE A FOURTH SCORE OF THE MUSIC EMOTION CORRESPONDING TO THE IMAGE STYLE BASED ON THE AT LEAST ONE FIRST IMAGE STYLE, THE AT LEAST ONE FIRST MUSIC EMOTION AND A PRESTORED SECOND PRESET LIST ~S502

DETERMINE A SUM OF THE THIRD SCORE AND THE FOURTH SCORE AS A FIRST SCORE OF THE TO-BE-SELECTED MUSIC CORRESPONDING TO THE IMAGE STYLE ~S503

FIG. 5

DETERMINE A FFITH SCORE OF THE MUSIC SCENE CORRESPONDING TO THE IMAGE THEME BASED ON THE AT LEAST ONE FIRST IMAGE THEME INCLUDED IN THE THEME ANALYSIS RESULT OF THE AT LEAST ONE IMAGE CORRESPONDING TO THE IMAGE STYLE, THE AT LEAST ONE FIRST MUSIC SCENE INCLUDED IN MUSIC SCENES AND A PRESTORED THIRD PRESET LIST ~S601

DETERMINE A SIXTH SCORE OF THE MUSIC EMOTION CORRESPONDING TO THE IMAGE THEME BASED ON THE AT LEAST ONE FIRST IMAGE THEME INCLUDED IN THE THEME ANALYSIS RESULT, THE AT LEAST ONE FIRST MUSIC EMOTION INCLUDED IN MUSIC EMOTIONS AND A PRESTORED FOURTH PRESET LIST ~S602

DETERMINE A SEVENTH SCORE OF THE MUSIC GENRE CORRESPONDING TO THE IMAGE THEME BASED ON THE AT LEAST ONE FIRST IMAGE THEME INCLUDED IN THE THEME ANALYSIS RESULT, THE AT LEAST ONE FIRST MUSIC GENRE INCLUDED IN MUSIC GENRES AND A PRESTORED FIFTH PRESET LIST ~S603

DETERMINE A SUM OF THE FIFTH SCORE, THE SIXTH SCORE AND THE SEVENTH SCORE AS A FIRST SCORE OF THE TO-BE-SELECTED MUSIC CORRESPONDING TO THE IMAGE THEME ~S604

FIG. 6

METHOD, DEVICE, STORAGE MEDIUM AND PROGRAM PRODUCT FOR MUSIC SCREENING

CROSS-REFERENCE TO RELATED APPLICATIONS

The present application claims priority to Chinese Patent Application No. 202110843309.7, filed on Jul. 26, 2021 and entitled "method, apparatus, device, storage medium and program product for music screening", the entirety of which is incorporated herein by reference.

FIELDS

The present disclosure relates to the technical field of terminals, and in particular to a method, apparatus, device, storage medium and program product for music screening.

BACKGROUND

Currently, when playing at least one image, a music may be configured for the at least one image to accompany the image, such that the music may be played while the at least one image is displayed sequentially.

In the related art, a user usually selects, among at least one piece of to-be-selected music based on his/her preference, a target music which is considered to match the image, and sets the target music as the music matching the image.

SUMMARY

Embodiments of the present application provide a method, apparatus, device, storage medium and program product for music screening.

In a first aspect, embodiments of the present application provide a method for music screening, comprising: obtaining at least one image and at least one piece of to-be-selected music; determining an analysis result of the at least one image corresponding to an image classification tag based on N predetermined image classification tags, N being an integer greater than or equal to 1; determining attribute information for each piece of to-be-selected music based on the at least one image and the at least one piece of to-be-selected music; determining target music that matches the at least one image among the at least one piece of to-be-selected music based on the analysis result and the attribute information of each piece of to-be-selected music.

In one possible design, the determining target music that matches the at least one image among the at least one piece of to-be-selected music based on the analysis result and the attribute information of each piece of to-be-selected music comprises: determining a target score of the at least one piece of to-be-selected music based on the analysis result and the attribute information of each piece of to-be-selected music; obtaining a music sequence by ranking the at least one piece to-be-selected music in an order of the target scores of the at least one piece of to-be-selected music; and determining a predetermined number of pieces of to-be-selected music ranking at the top of the music sequence as the target music that matches the at least one image.

In one possible design, the determining a target score of the at least one piece of to-be-selected music based on the analysis result and the attribute information of each piece of to-be-selected music comprises: for each piece of to-be-selected music, determining a first score of the to-be-selected music corresponding to each image classification tag based on the analysis result and the attribute information of the to-be-selected music; obtaining respective corresponding weights of the N image classification tags; and determining a target score of the to-be-selected music based on the first score of the to-be-selected music corresponding to each image classification tag, the respective corresponding weights of the N image classification tags and an initial score of the to-be-selected music, the initial score of the to-be-selected music being included in the attribute information of the to-be-selected music.

In one possible design, the N image classification tags comprise at least one of: an image emotion, an image style, or an image theme; the attribute information further comprises M music classification tags of the to-be-selected music, M being an integer greater than or equal to 1; and the M music classification tags comprise at least one of: a music style, a music emotion, or a music scene.

In one possible design, the analysis result is an emotion analysis result of the at least one image corresponding to the image emotion, the emotion analysis result comprising at least one first image emotion and a confidence level of the at least one first image emotion; the attribute information comprises a music emotion of the to-be-selected music, the music emotion comprising the at least one first music emotion;

the determining a first score of the to-be-selected music corresponding to the image emotion based on the emotion analysis result and the music emotion comprises: determining a score of the at least one first music emotion corresponding to the image emotion based on the at least one first image emotion, the confidence level of the at least one first image emotion and the at least one first music emotion; and determining a ratio of a sum of the scores of the at least one first music emotion corresponding to the image emotion to a total number of emotions of the at least one first music emotion as a first score of the to-be-selected music corresponding to the image emotion.

In one possible design, the determining a score of the at least one first music emotion corresponding to the image emotion based on the at least one first image emotion, the confidence level of the at least one first image emotion and the at least one first music emotion comprises:

step 1: obtaining an ith first music emotion of the at least one first music emotion;

step 2: obtaining an jth first image emotion of the at least one first image emotion;

step 3: looking up an jth correlation value corresponding to the ith first music emotion and the jth first image emotion in a prestored correlation list; the correlation list comprising a plurality of correlation values corresponding to the first music emotion and the first image emotion;

step 4: determining a sum of a product of the jth correlation value and the confidence level of the jth first image emotion and a $(j-1)$th score of the jth first music emotion corresponding to an $(j-1)$th first image emotion as an jth score of the ith first music emotion corresponding to the jth first image emotion;

adding j by 1 and repeating steps 2, 3, and 4 until j is equal to Y, to obtain a Yth score of the ith first music emotion corresponding to the Yth first image emotion;

determining a ratio of the Yth score to a sum of the confidence levels of the at least one first image emotion as a score of the ith first music emotion corresponding to the image emotion;

wherein i is an integer between 1 and X, j is an integer between 1 and Y, X is a total number of emotions of the at least one first music emotion, and Y is a total number of emotions of the at least one first image emotion.

In one possible design, the analysis result is a style analysis result of the at least one image corresponding to the image style, the style analysis result comprising at least one first image style; the attribute information comprises a music emotion and a music genre of the to-be-selected music, the music genre comprising at least one first music genre, and the music emotion comprising at least one first music emotion;

the determining a first score of the to-be-selected music corresponding to the image style based on the style analysis result, the music emotion and the music genre comprises: determining a third score of the music genre corresponding to the image style based on the at least one first image style, the at least one first music genre and a prestored first predetermined list; the first predetermined list comprising a plurality of first image styles and a first music genre corresponding to each first image style; determining a fourth score of the music emotion corresponding to the image style based on at least one first image style, the at least one first music emotion and a prestored second predetermined list; the second predetermined list comprising first image styles and a first music emotion corresponding to each first image style; determining a sum of the third score and the fourth score as a first score of the to-be-selected music corresponding to the image style.

In one possible design, the determining a third score of the music genre corresponding to the image style based on the at least one first image style, the at least one first music genre and a prestored first predetermined list comprises:

for each first image style, looking up a first music genre corresponding to the first image style in the first predetermined list; if the found first music genre corresponding to the first image style exists among the at least one first music genre, obtaining a score of the found first music genre corresponding to the first image style; determining a sum of the scores of the found first music genre corresponding to the first image style as a score of the music genre corresponding to the first image style; and determining the largest one among the scores of the music genre corresponding to each of the first image styles as a third score of the music genre corresponding to the image style.

In one possible design, the analysis result is a theme analysis result of the at least one image corresponding to the image theme, the theme analysis result comprising at least one first image theme; the attribute information comprises a music scene, a music emotion and a music genre of to-be-selected music, the music scene comprising at least one first music scene, the music emotion comprising at least one first music emotion, and the music genre comprising at least one first music genre;

the determining a first score of the to-be-selected music corresponding to the image theme based on the theme analysis result, the music scene, the music emotion and the music genre comprises: determining a fifth score of the music scene corresponding to the image theme based on the at least one first image theme, the at least one first music scene, and a prestored third predetermined list; the third predetermined list comprising a plurality of first image themes and a first music scene corresponding to each first image style; determining a sixth score of the music emotion corresponding to the image theme based on the at least one first image theme, the at least one first music emotion and a prestored fourth predetermined list; the fourth predetermined list comprising the plurality of first image themes and a first music emotion corresponding to each first image style; determining a seventh score of the music genre corresponding to the image theme based on the at least one first image theme, the at least one first music genre and a prestored fifth predetermined list; the fifth predetermined list comprising the plurality of first image themes and a first music genre corresponding to each first image style; and determining a sum of the fifth score, the sixth score and the seventh score as a first score of the to-be-selected music corresponding to the image theme.

In one possible design, the determining a target score of the to-be-selected music based on a first score of the to-be-selected music corresponding to each image classification tag, respective weights corresponding to the N image classification tags and an initial score of the to-be-selected music comprises: for each image classification tag, determining a product of a first score of the to-be-selected music corresponding to each image classification tag and a weight corresponding to the image classification tag to obtain a first product corresponding to the image classification tag; and determining a sum of the first product corresponding to the N image classification tags and the initial score of the to-be-selected music as a target score of the to-be-selected music.

In one possible design, the determining an analysis result of the at least one image corresponding to the image classification tag based on the predetermined N image classification tags comprises: analyzing and processing the at least one image based on the predetermined N image classification tags and with respective image analysis models corresponding to the N image classification tags, to obtain an analysis result of the at least one image corresponding to the image classification tag; the respective image analysis models corresponding to the N image classification tags are obtained by training the respective plurality of sample images corresponding to the N image classification tags.

In one possible design, the determining attribute information of each piece of to-be-selected music based on the at least one image and the at least one piece of to-be-selected music comprises: processing the at least one image and each piece of to-be-selected music with a pre-trained music matching model, to obtain the attribute information of each piece of to-be-selected music, the music matching model being obtained by training a plurality of sample images and a plurality of pieces of sample music.

In one possible design, the obtaining at least one image comprises: obtaining at least one frame of image from at least one to-be-processed video and determining the at least one frame of image as the at least one image; or obtaining at least one frame of image from at least one to-be-processed video and determining the at least one frame of image and a prestored image as the at least one image.

In a second aspect, embodiments of the present application provide an apparatus for music screening, comprising: an obtaining module, a first determining module, a second determining module and a third determining module; wherein the obtaining module is configured to obtain at least one image and at least one piece of to-be-selected music; the first determining module is configured to determine an analysis result of the at least one image corresponding to an image classification tag based on N predetermined image classification tags. N being an integer greater than or equal to 1; the second determining module is configured to determine attribute information for each piece of to-be-selected music based on the at least one image and the at least one piece of to-be-selected music; the third determining module is configured to determine target music that matches the at least one image among the at least one piece of to-be-selected music based on the analysis result and the attribute information of each piece of to-be-selected music.

In one possible design, the third determining module is specifically used to: determine a target score of the at least one piece of to-be-selected music based on the analysis result and the attribute information of each piece of to-be-selected music; obtain a music sequence by ranking the at least one piece to-be-selected music in an order of the target scores of the at least one piece of to-be-selected music; and determine a predetermined number of pieces of to-be-selected music ranking at the top of the music sequence as the target music that matches the at least one image.

In one possible design, the third determining module is specifically used to: for each piece of to-be-selected music, determine a first score of the to-be-selected music corresponding to each image classification tag based on the analysis result and the attribute information of the to-be-selected music; obtain respective corresponding weights of the N image classification tags; and determine a target score of the to-be-selected music based on the first score of the to-be-selected music corresponding to each image classification tag, the respective corresponding weights of the N image classification tags and an initial score of the to-be-selected music, the initial score of the to-be-selected music being included in the attribute information of the to-be-selected music.

In one possible design, the N image classification tags comprise at least one of: an image emotion, an image style, or an image theme; the attribute information further comprises M music classification tags of the to-be-selected music, M being an integer greater than or equal to 1; and the M music classification tags comprise at least one of: a music style, a music emotion, or a music scene.

In one possible design, the analysis result is an emotion analysis result of the at least one image corresponding to the image emotion, the emotion analysis result comprising at least one first image emotion and a confidence level of the at least one first image emotion; the attribute information comprises a music emotion of the to-be-selected music, the music emotion comprising the at least one first music emotion;

the third determining module is specifically used to: determine a score of the at least one first music emotion corresponding to the image emotion based on the at least one first image emotion, the confidence level of the at least one first image emotion and the at least one first music emotion; and determine a ratio of a sum of the scores of the at least one first music emotion corresponding to the image emotion to a total number of emotions of the at least one first music emotion as a first score of the to-be-selected music corresponding to the image emotion.

In one possible design, the third determining module is specifically configured to:

in step 1: obtain an ith first music emotion of the at least one first music emotion; in step 2: obtain an jth first image emotion of the at least one first image emotion; in step 3: look up an jth correlation value corresponding to the ith first music emotion and the jth first image emotion in a prestored correlation list; the correlation list comprising a plurality of correlation values corresponding to the first music emotion and the first image emotion;

in step 4: determine a sum of a product of the jth correlation value and the confidence level of the jth first image emotion and a (j−1)th score of the jth first music emotion corresponding to an (j−1)th first image emotion as an jth score of the ith first music emotion corresponding to the jth first image emotion;

add j by 1 and repeat steps 2, 3, and 4 until j is equal to Y, to obtain a Yth score of the ith first music emotion corresponding to the Yth first image emotion;

determine a ratio of the Yth score to a sum of the confidence levels of the at least one first image emotion as a score of the ith first music emotion corresponding to the image emotion;

i is an integer between 1 and X, j is an integer between 1 and Y, X is a total number of emotions of the at least one first music emotion, and Y is a total number of emotions of the at least one first image emotion.

In one possible design, the analysis result is a style analysis result of the at least one image corresponding to the image style, the style analysis result comprising at least one first image style; the attribute information comprises a music emotion and a music genre of the to-be-selected music, the music genre comprising at least one first music genre, and the music emotion comprising at least one first music emotion;

the third determining module is specifically used to: determine a third score of the music genre corresponding to the image style based on the at least one first image style, the at least one first music genre and a prestored first predetermined list; the first predetermined list comprising a plurality of first image styles and a first music genre corresponding to each first image style; determine a fourth score of the music emotion corresponding to the image style based on at least one first image style, the at least one first music emotion and a prestored second predetermined list; the second predetermined list comprising first image styles and a first music emotion corresponding to each first image style; determine a sum of the third score and the fourth score as a first score of the to-be-selected music corresponding to the image style.

In one possible design, the third determining module is specifically used to: for each first image style, look up a first music genre corresponding to the first image style in the first predetermined list; if the found first music genre corresponding to the first image style exists among the at least one first music genre, obtain a score of the found first music genre corresponding to the first image style; determine a sum of the scores of the found first music genre corresponding to the first image style as a score of the music genre corresponding to the first image style; and determine the largest one among the scores of the music genre corresponding to each of the first image styles as a third score of the music genre corresponding to the image style.

In one possible design, the analysis result is a theme analysis result of the at least one image corresponding to the image theme, the theme analysis result comprising at least one first image theme; the attribute information comprises a music scene, a music emotion and a music genre of to-be-selected music, the music scene comprising at least one first music scene, the music emotion comprising at least one first music emotion, and the music genre comprising at least one first music genre;

The third determining module is specifically used to: determine a fifth score of the music scene corresponding to the image theme based on the at least one first image theme, the at least one first music scene, and a prestored third predetermined list; the third predetermined list comprising a plurality of first image themes and a first music scene corresponding to each first image style; determine a sixth score of the music emotion corresponding to the image theme based on the at least one first image theme, the at least one first music emotion and a prestored fourth predetermined list; the fourth predetermined list comprising the plurality of first image themes and a first music emotion corresponding to each first image style; determine a seventh score of the music genre corresponding to the image theme based on the at least one first image theme, the at least one first music genre and a prestored fifth predetermined list; the fifth predetermined list comprising the plurality of first image themes and a first music genre corresponding to each first image style; and determine a sum of the fifth score, the sixth score and the seventh score as a first score of the to-be-selected music corresponding to the image theme.

In one possible design, the third determining module is specifically used to: for each image classification tag, determine a product of a first score of the to-be-selected music corresponding to each image classification tag and a weight corresponding to the image classification tag to obtain a first product corresponding to the image classification tag; and determine a sum of the first product corresponding to the N image classification tags and the initial score of the to-be-selected music as a target score of the to-be-selected music.

In one possible design, the first determining module is specifically used to: analyze and process the at least one image based on the predetermined N image classification tags and with respective image analysis models corresponding to the N image classification tags, to obtain an analysis result of the at least one image corresponding to the image classification tag; the respective image analysis models corresponding to the N image classification tags are obtained by training respective plurality of sample images corresponding to the N image classification tags.

In one possible design, the second determining module is specifically used to: process the at least one image and each piece of to-be-selected music with a pre-trained music matching model, to obtain the attribute information of each piece of to-be-selected music, the music matching model being obtained by training a plurality of sample images and a plurality of pieces of sample music.

In one possible design, the obtaining module is specifically used to: obtain at least one frame of image from at least one to-be-processed video and determine the at least one frame of image as the at least one image; or obtain at least one frame of image from at least one to-be-processed video and determine the at least one frame of image and a prestored image as the at least one image.

In a third aspect, embodiments of the present application provide a terminal device, comprising: a processor and a memory;

the memory storing computer-executed instructions;

the processor executing the computer-executed instructions stored in the memory, causing the processor to perform the music screening method in the first aspect.

In a fourth aspect, embodiments of the present application provide a computer-readable storage medium, on which computer-executed instructions are stored, the computer-executed instructions, when executed by a processor, performing the music screening method in the first aspect.

In a fifth aspect, embodiments of the present application provide a computer program product, comprising a computer program which, when executed by a processor, performs the music screening method in the first aspect.

In a sixth aspect, embodiments of the present application provide a computer program which, when executed by a processor, performs the music screening method in the first aspect.

BRIEF DESCRIPTION OF THE DRAWINGS

In order to more clearly illustrate the technical solutions in the present application or the prior art, a brief introduction is given below to the accompanying drawings to be used in the description of the embodiments or the prior art. It is obvious that the accompanying drawings in the following description are some embodiments of the present application, and those of ordinary skill in the art may further obtain other figures according to these accompanying drawings without the exercise of any inventive skill.

FIG. 5 shows a flowchart of determining a first score of to-be-selected music corresponding to an image style provided by embodiments of the present application;

FIG. 6 shows a flowchart of determining a first score of to-be-selected music corresponding to an image theme provided by embodiments of the present application;

DETAILED DESCRIPTION

As briefly mentioned, when playing at least one image, a music may be configured for the at least one image to accompany the image. In related art, a user usually selects the target music which is considered to match the image among at least one piece of to-be-selected music based on the preference, which usually reduces the match degree of the target music with the at least one image.

Embodiments of the present application provide a method, apparatus, device, storage medium and program product for music screening. The method comprises: obtaining at least one image and at least one piece of to-be-selected music; determining an analysis result of the at least one image corresponding to an image classification tag based on N predetermined image classification tags, N being an integer greater than or equal to 1; determining attribute information for each piece of to-be-selected music based on the at least one image and the at least one piece of to-beselected music; determining target music that matches the at least one image among the at least one piece of to-be-selected music based on the analysis result and the attribute information of each piece of to-be-selected music. In the method, the target music that matches the at least one image is determined with reference to the analysis result and the attribute information of each piece of to-be-selected music. In this way, it is possible to improve the match degree of the target music with the at least one image and solve the problem of low match degree of the target music with the at least one image when the user selects the target music among the at least one piece of to-be-selected music based on the preference.

In order to make the objectives, technical solutions and advantages of the present application clearer, the technical solutions in the present application will be described clearly and completely below conjunction with the accompanying drawings. It is obvious that the embodiments described here are a part rather than all of the embodiments in the present application. Based on the embodiments in the present application, all other embodiments obtained by those of ordinary skill in the art without the exercise of any inventive skill fall within the protection scope of the present application.

An application scenario of a music screening method provided by the embodiments of the present application is described below in conjunction with FIG. 1

Figure 1:
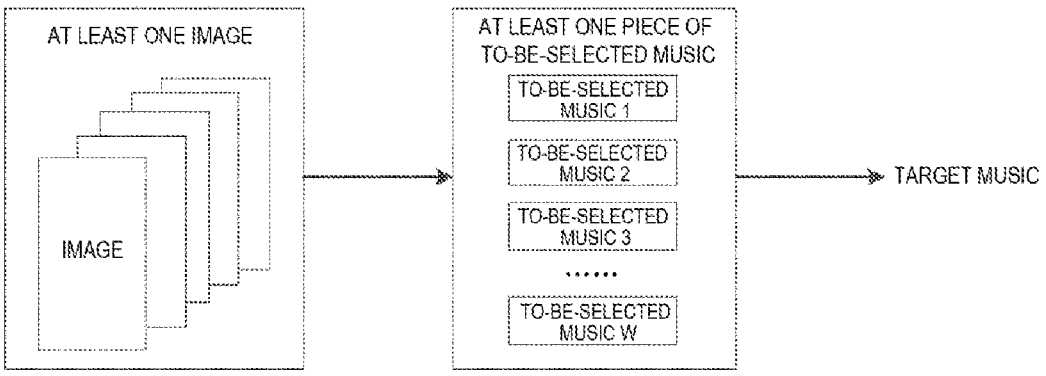
FIG. 1 shows a diagram of an application scenario of a music screening method provided by embodiments of the present application.

FIG. 1 is a diagram of an application scenario of a music screening method provided by the embodiments of the present application. As depicted, there are comprised: at least one image and at least one piece of to-be-selected music. As an example, the at least one image comprises 5 images, and the at least one piece of to-be-selected music comprises W pieces of music, wherein W is an integer greater than or equal to 1.

In the related art, the user usually selects the target music which is considered to match the image among at least one piece of to-be-selected music based on the preference, which usually reduces the match degree of the target music with the at least one image.

In the present application, in order to improve the match degree of the target music with a group of images, the inventor has conceived of: determining attribute information of each piece of to-be-selected music according to at least one image and a plurality of pieces of to-be-selected music, and determining target music that matches the at least one image among at least one piece of to-be-selected music according to the attribute information of the each piece of to-be-selected music and an analysis result obtained through processing the at least one image, so as to improve the match degree of the target music with the group of images and further solve the problem of the low match degree of the target music with the at least one image when the user selects the target music from the at least one piece of to-be-selected music according to the preference.

The technical solution of the present application is described in detail below by way of specific embodiments. The following specific embodiments may be combined with each other, and the same or similar concepts or processes might not be repeated in some embodiments.

Figure 2:
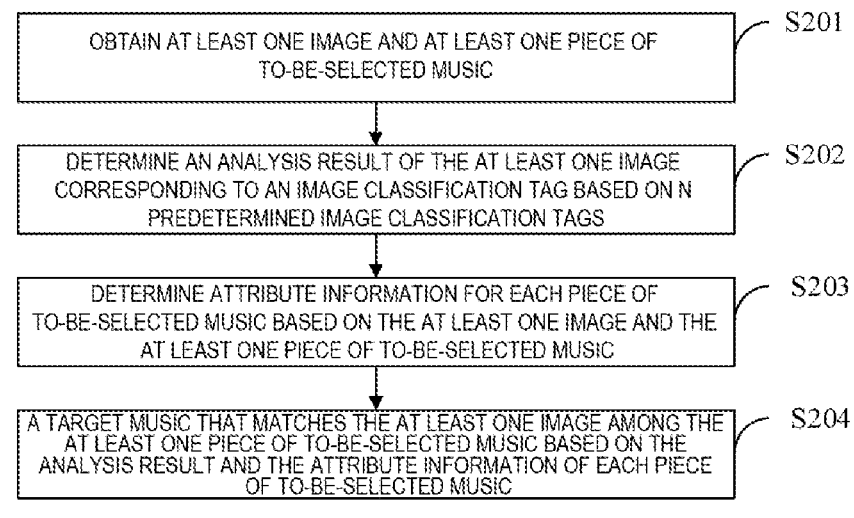
FIG. 2 shows a flowchart of a method for music screening provided by embodiments of the present application.

FIG. 2 shows a flowchart of a music screening method provided by an embodiment of the present application. As depicted, the method comprises:

S201: obtaining at least one image and at least one piece of to-be-selected music.

The execution body of the embodiment of the present application may be a terminal device or a music screening apparatus arranged in the terminal device. The terminal device may be, for example, a smartphone, a tablet computer, a desktop computer, and the like. The music screening apparatus may be implemented by a combination of software and/or hardware. The software includes, but is not limited to, a short video play back application installed in the terminal device.

In one possible design, at least one frame of image is obtained from at least one to-be-processed video; the at least one frame of image is determined to be the at least one image. The at least one to-be-processed video is a video stored in the terminal device in advance.

The above at least one frame of image may include all of image frames in the at least one to-be-processed video, or may include part of image frames in the at least one to-be-processed video.

Optionally, when the at least one frame of image includes part of image frames in the at least one to-be-processed video, the at least one to-be-processed video may be subjected to a frame-skipping screening process in accordance with a predetermined number of frames, to obtain the at least one frame of image. As an example, when the at least one to-be-processed video includes an image frame 1, an image frame 2, an image frame 3, an image frame 4 and an image frame 5, if the predetermined number of frames is 1, the resulting at least one frame of image includes the image frame 1, the image frame 3 and the image frame 5.

Optionally, before obtaining the at least one frame of image from the at least one to-be-processed video, there may be further comprised: determining whether a size of the at least one to-be-processed video is larger than a predetermined threshold; if yes, performing a frame-skipping screening process on the at least one to-be-processed video according to a predetermined number of frames, to obtain the at least one frame of image.

In another possible design, the at least one frame of image is obtained from the at least one to-be-processed video; the at least one frame of image and a prestored image in the terminal device are determined to be the at least one image.

In yet another possible design, a to-be-processed image that is prestored in the terminal device is determined to be the at least one image.

The at least one piece of to-be-selected music may be pre-cached in the terminal device or may be prestored in a server corresponding to the short video playback application in the terminal device. If the at least one to-be-selected music is stored in the server, when the terminal device needs to obtain the at least one to-be-selected music, a request message may be sent to the server to cause the server to send the at least one to-be-selected music to the terminal device.

In practice, the server or the terminal device may further update the at least one to-be-selected music. As an example, when the terminal device caches the at least one to-be-selected music and updates the at least one to-be-selected music, music lately played in the terminal device is recorded and the lately played music is added to the at least one to-be-selected music; or, an update message sent by the server is received which includes at least one piece of music, and the terminal device, after receiving the at least one piece of music, adds the at least one piece of music to the at least one piece of to-be-selected music.

S202: an analysis result of the at least one image corresponding to an image classification tag is determined based on N predetermined image classification tags.

N is an integer greater than or equal to 1. The N image classification tags comprise at least one of image emotion, image style and image theme.

When N is equal to 3, the 3 image classification tags are image emotion, image style, and image theme.

Each image classification tag corresponds to an analysis result. As an example, the analysis result corresponding to the image emotion is an emotion analysis result, the analysis result corresponding to the image style is a style analysis result, and the analysis result corresponding to the image theme is a theme analysis result.

In one possible design, the at least one image is analyzed and processed according to the predetermined N image classification tags and with respective image analysis models corresponding to the image classification tags, to obtain an analysis result of the image classification tag corresponding to the at least one image. The respective image analysis models corresponding to the N image classification tags are obtained by training a plurality of sample images corresponding to the N image classification tags respectively.

The plurality of sample images corresponding to the N image classification tags respectively may either be same or be different.

As an example, when the N image classification tags comprise image emotion, image style and image theme, the image analysis model corresponding to the image emotion is an emotion analysis model, the image analysis model corresponding to the image style is a style analysis model, and the image analysis model corresponding to the image theme is a theme analysis model.

Further, an emotion analysis result is obtained by analyzing and processing the at least one image with the emotion analysis model, a style analysis result is obtained by analyzing and processing the at least one image with the style analysis model, and a theme analysis result is obtained by analyzing and processing the at least one image with a theme analysis model.

The image analysis models corresponding to the N image classification tags respectively may be obtained by training the same or different first initial models using respective plurality of sample images corresponding to the N image classification tags.

The first initial model may be a neural network, or may be other machine learning model, which are is described in detail herein. The same first initial models indicates that the first initial models have the same structure, and the different first initial models indicate that the first initial models have different structures.

In another possible design, an analysis result of the image classification tag corresponding to the at least one image may be obtained by analyzing and processing the at least one image with a pre-trained image analysis model according to the predetermined N image classification tags. The pre-trained image analysis model is obtained by training a second initial model using a plurality of sample images.

The second initial model may also be a neural network, or may be other machine learning model, which are is described in detail herein. The second initial model is different from the first initial model.

The emotion analysis result may comprise at least one first image emotion. The emotion analysis result may further comprise a confidence level of the at least one first image emotion. For example, the at least one first image emotion comprises: image emotion 1, image emotion 2, image emotion 3, etc.

The style analysis result may comprise at least one first image style. For example, the at least one first image style comprises: image style 1, image style 2, image style 3, image style 4, etc.

The theme analysis result may comprise at least one first image theme. For example, the at least one first image theme comprises: image theme 1, image theme 2, etc.

S203: attribute information of each piece of to-be-selected music is determined based on the at least one image and the at least one piece of to-be-selected music.

In one possible design, the attribute information of each piece of to-be-selected music is obtained by processing the at least one image and each piece of to-be-selected music separately with a pre-trained music matching model. The music matching model is obtained by training a third initial model using a plurality of sample images and a plurality of pieces of sample music.

The third initial model may be a neural network, or may be other machine learning model, which is not described in detail herein.

The attribute information comprises an initial score for each piece of to-be-selected music. The attribute information may also comprise M music classification tags for the to-be-selected music. M is an integer greater than or equal to 1.

The M music classification tags comprise any at least one of music genre, music emotion, or music scene.

The music genre may comprise at least one first music genre. For example, the at least one first music genre comprises: music genre 1, music genre 2, etc.

The musical emotion may comprise at least one first music emotion. For example, the at least one first music emotion comprises: music emotion 1, music emotion 2, music emotion 3, etc.

The music scene may comprise at least one first music scene. For example, the at least one first music scene includes: music scene 1, music scene 2, etc.

In another possible design, the attribute information of each piece of to-be-selected music may be obtained by processing the at least one image and the at least one piece of to-be-selected music with a predetermined online soundtrack algorithm. For a detailed description of the online soundtrack algorithm, reference may be made to the related art, which is not detailed here.

In yet another possible design, for each of the at least one piece of to-be-selected music, M music classification tags of the to-be-selected music are obtained; the attribute information of the to-be-selected music is obtained by processing the M music classification tags of the to-be-selected music and the at least one image with a predetermined training model. In this design, the M music classification tags of the to-be-selected music are classification tags which are pre-stored in the terminal device.

S204: a target music that matches the at least one image among the at least one piece of to-be-selected music is determined based on the analysis result and the attribute information of each piece of to-be-selected music.

In one possible design, a target score for the at least one piece of to-be-selected music is determined according to the analysis result and the attribute information of each piece of to-be-selected music; a music sequence is obtained by ranking the at least one piece of to-be-selected music in an order of the target scores of the at least one piece of to-be-selected music; and a predetermined number of pieces of to-be-selected music ranking at the top of the music sequence are determined to be the target music that matches the at least one image.

Figure 3:
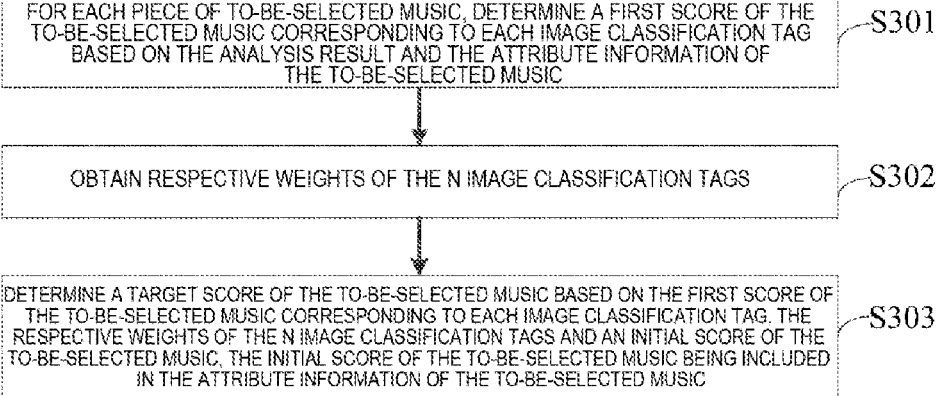
FIG. 3 shows a flowchart of determining a target score provided by embodiments of the present application.

Specifically, for a detailed description of determining a target score for the at least one piece of to-be-selected music according to the analysis result and the attribute information of each piece of to-be-selected music, reference may be made to the embodiment in FIG. 3, which is not detailed herein.

The predetermined number may be 1, 2, 3, etc., which is not limited herein.

As an example, the at least one piece of to-be-selected music comprises music 1, music 2, and music 3. If the target score for music 1 is 20, the target score for music 2 is 10, and the target score for music 3 is 50, then the music sequence is [music 3, music 1, music 2]. Further, when the predetermined number is 1, music 3 is determined as the target music.

In another possible design, an initial sequence is obtained by ranking the at least one piece of to-be-selected music according to the attribute information of each piece of to-be-selected music; a target score for the at least one piece of to-be-selected music is determined according to the analysis result and the attribute information of each piece of to-be-selected music; a music sequence is obtained by adjusting the initial sequence according to the target score for the at least one piece of to-be-selected music; and a predetermined number of pieces of to-be-selected music ranking at the top of the music sequence are determined as the target music that matches the at least one image.

The attribute information comprises an initial score for the to-be-selected music.

Specifically, the initial sequence is obtained by ranking the at least one piece of to-be-selected music according to the initial score of each piece of to-be-selected music. As an example, the at least one piece of to-be-selected music comprises music 1, music 2, and music 3. If the initial score of music 1 is 15, the initial score of music 2 is 20, and the initial score of music 3 is 25, the initial sequence is determined to be [music 3, music 2, music 1].

If the target score of the music 1 is 20, the target score of the music 2 is 10, and the target score of the music 3 is 50, the initial sequence [music 3, music 2, music 1] is adjusted to obtain a music sequence [music 3, music 1, music 2].

Further, if the music sequence is [music 3, music 2, music 1], music 3 is determined as the target music when the predetermined number is 1.

In the music screening method provided in the embodiment of FIG. 2, according to the predetermined N image classification tags, the analysis result of the at least one image corresponding to the image classification tags is determined; the attribute information of each piece of to-be-selected music is determined according to the at least one image and the at least one piece of to-be-selected music; and the target music that matches the at least one image is determined with reference to the analysis result and the attribute information of each piece of to-be-selected music. In this way, it is possible to improve the match degree of the target music with the at least one image and solve the problem of low match degree of the target music with the at least one image when the user selects the target music among the at least one piece of to-be-selected music according to the preference.

In addition, in the related art, when the user selects the target music among the at least one piece of to-be-selected music according to the preference, the user is required to listen to a plurality of pieces of to-be-selected music, which results in a complicated operation of the user selecting the target music and reduces the efficiency of determining the target music. In the present application, the terminal device may perform the music screening method on its own to determine the target music without requiring the user to listen to a plurality of pieces of to-be-selected music, simplifying the user operation and improving the efficiency of determining the target music.

Further, in the present application, the user experience can be improved since the efficiency of determining the target music and the match degree of the target music with the at least one image is increased.

On the basis of the embodiment of FIG. 2 described above, a method of determining a target score of the at least one piece of to-be-selected music according to an analysis result and an initial score of the at least one piece of to-be-selected music is described below in connection with FIG. 3. Specifically, reference is made to FIG. 3.

FIG. 3 shows a flowchart of determining a target score provided by an embodiment of the present application. As shown in FIG. 3, the method comprises:

S301: for each piece of to-be-selected music, determining a first score for the to-be-selected music corresponding to each image classification tag according to the analysis result and the attribute information of the to-be-selected music.

When the analysis result is an emotion analysis result, the attribute information may include music scene, music emotion, and/or music genre.

As an example, when the attribute information includes musical emotion, for each piece of the to-be-selected music, a first score (Score1) corresponding to the image emotion of the to-be-selected music is determined according to the emotion analysis result and the music emotion. Specifically, for a description of the method for determining the first score of the corresponding image emotion of the to-be-selected music, reference may be made to the embodiment of FIG. 4, which will not be repeated here.

When the analysis result is a style analysis result, the attribute information may include music scene, music emotion, and/or music genre.

As an example, when the attribute information includes music emotion and music genre, for each piece of the to-be-selected music, a first score (Score2) corresponding to the image style of the to-be-selected music is determined according to the style analysis result, music emotion and music genre. Specifically, for a description of the method for determining the first score for the corresponding image style of the to-be-selected music, reference may be made to the embodiment of FIG. 5, which will not be repeated here.

When the analysis result is a theme analysis result, the attribute information may include music scene, music emotion, and/or music genre.

As an example, when the attribute information includes music scene, music emotion and music genre, for each piece of the to-be-selected music, a first score (Score3) corresponding to the image theme of the to-be-selected music is determined according to the theme analysis result, the music scene, the music emotion and the music genre. Specifically, for a description of the method for determining the first score of the image theme corresponding to the to-be-selected music, reference may be made to the embodiment of FIG. 6, which will not be repeated here.

S302: respective weights corresponding to the N image classification tags are obtained.

The N weights are stored in advance in the terminal device, or in the above-described server.

When the N image classification tags comprise image emotion, image style, and image theme, the weight corresponding to the image emotion is W1, the weight corresponding to the image style is W2, and the weight corresponding to the image theme is W3.

S303: a target score of the to-be-selected music is determined based on the first score of the to-be-selected music corresponding to each image classification tag, the respective weights corresponding to the N image classification tags, and the initial score of the to-be-selected music. The initial score of the to-be-selected music is included in the attribute information of the to-be-selected music.

In one possible design, for each image classification tag, a product of the first score (as an example, Score1, Score2, Score3) of the image classification tag corresponding to the to-be-selected music and the weight (accordingly, W1, W2, W3) corresponding to the image classification tag is determined to obtain a first product corresponding to the image classification tag;

a sum of the first product corresponding to the N image classification tags and the initial score of the to-be-selected music is determined as a target score of the to-be-selected music.

The target score may be determined by the following formula: $S=Score0+W1*Score1+W2*Score2+W3*Score3$; wherein S is the target score of the to-be-selected music and Score $0$ is the initial score of the to-be-selected music. Score $1$, Score $2$ and/or Score $3$ in the formula may be equal to 0.

In the embodiment of FIG. 3, the target score of the to-be-selected music is determined according to the first score of the to-be-selected music corresponding to each of the image classification tags, the respective weights corresponding to the N image classification tags, and the initial score of the to-be-selected music. That is, reference is made to the corresponding first scores of the plurality of image classification tags during the process of determining the target score, which improves the accuracy of determining the target score.

Figure 4:
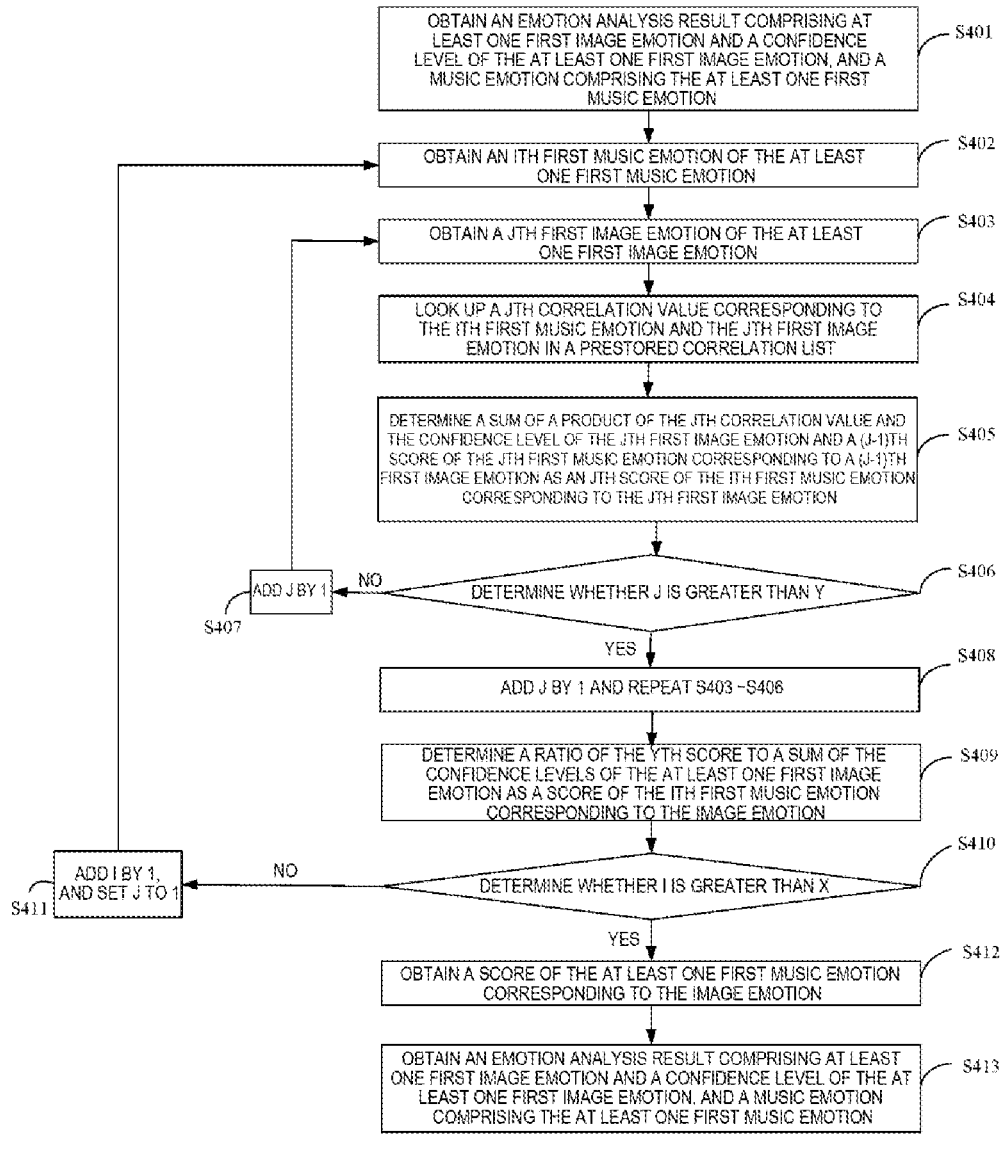
FIG. 4 shows a flowchart of a flowchart of determining a first score of to-be-selected music corresponding to an image emotion provided by embodiments of the present application.

FIG. 4 shows a flowchart of determining a first score of image emotion corresponding to the to-be-selected music provided by an embodiment of the present application. As shown in FIG. 4, the method comprises:

S401: obtaining an emotion analysis result that comprises at least one first image emotion and a confidence level of the at least one first image emotion, and music emotion that comprises at least one first music emotion;

S402: obtaining an ith first music emotion of the at least one first music emotion;

initially, i is equal to 1.

S403: obtaining a jth first image emotion of the at least one first image emotion;

initially, j is equal to 1.

S404: looking up an jth correlation value corresponding to the ith first music emotion and the jth first image emotion in a prestored correlation list. The correlation list comprises a plurality of correlation values corresponding to the first music emotion and the first image emotion.

As an example, the correlation list has the format of Table 1 below.

TABLE 1

|  | Image emotion 1 | Image emotion 2 | Image emotion 3 | . . . |
|---|---|---|---|---|
| Music Emotion 1 | 0.15 | 0.2 | 0.1 | . . . |
| Music Emotion 2 | 0.13 | 0.21 | 0.32 | . . . |
| . . . | . . . | . . . | . . . | . . . |

As an example, the ith first music emotion is music emotion 1 and the jth first image emotion is image emotion 2, and then the jth correlation value corresponding to the ith first music emotion and the jth first image emotion is 0.2.

It is noteworthy that for each first music emotion, the sum of the correlation values corresponding to the first music emotion and the respective at least one first image emotion is equal to 1. As an example, for music emotion 1, the sum of the correlation values corresponding to music emotion 1 and image emotion 1, image emotion 2, image emotion 3, . . . , etc., respectively, is equal to 1, i.e., 0.15+0.2+0.1+ . . . =1.

In one possible design, the first music emotion has a corresponding music emotion identifier and the first image emotion has a corresponding image emotion identifier; the music emotion identifier of the ith first music emotion of the at least one first music emotion may be obtained; the image emotion identifier of the jth first image emotion of the at least one first image emotion may be obtained; and, the jth correlation value corresponding to the music emotion identifier and the image emotion identifier is looked up in the prestored correlation list. The correlation list comprises a plurality of correlation values corresponding to the music emotion identifiers and the image emotion identifiers. The correlation list herein is similar to Table 1 above, which will not be repeated herein.

Optionally, before S404, the technical solution provided by the present application may further comprise: determining a correlation list. For a detailed description of determining the correlation list, reference may be made to the embodiment of FIG. 7.

S405: the sum of the product of the jth correlation value and the confidence level of the jth first image emotion and the (j−1)th score of the (j−1)th first music emotion corresponding to the (j−1)th first image emotion is determined to be the jth score of the jth first image emotion corresponding to the ith first music emotion.

Initially, the (j−1)th score is equal to 0.

S406: determining whether j is greater than Y.

If not, S407 is performed, otherwise S408 is performed.

Y is a total number of emotions of the at least one first image emotion.

S407: adding j by 1, and repeating S403~S406.

S408: obtaining the Yth score of the Yth first image emotion corresponding to the ith first music emotion.

S409: determining a ratio of the Yth score to the sum of confidence levels of the at least one first image emotion as a score of the image emotion corresponding to the ith first music emotion.

In one possible design, before S401, or between S401 and S402, there may be further comprised: constructing a score list. Accordingly, between S410 and S411, there may be further comprised: storing the score of the image emotion corresponding to the ith first music emotion in the score list.

S410: determining whether i is greater than X.

If not, S411 is performed, otherwise S412 is performed.

X is a total number of emotions of the at least one first music emotion.

S411: adding i by 1, setting j to 1, and repeating S402~S410.

S412: obtaining a score of the image emotion corresponding to the at least one first music emotion.

As an example, when X is equal to 2, i.e., when the at least one first music emotion includes music emotion 1 and music emotion 2, a score of 10 of the image emotion corresponding to the music emotion 1 and a score of 5 of the image emotion corresponding to the music emotion 2 may be obtained.

It is noteworthy that the above S402~S412 are explanatory illustration for determining a score of the image emotion corresponding to the at least one first music emotion according to the at least one first image emotion, the confidence level of the at least one first image emotion, and the at least one first music emotion.

S413: determining a ratio of the sum of scores of the image emotion corresponding to the at least one first music emotion to the total number of emotions of the at least one first music emotion is determined as a first score of the image emotion corresponding to the to-be-selected music.

Further, on the basis of S412, the total number of emotions of the at least one first musical emotion is equal to 2, and thus the first score of the image emotion corresponding to the to-be-selected music is equal to (10+5)/2=7.5.

When constructing the score list and storing the scores of the image emotion corresponding to the at least one first music emotion in the score list, S413 may also be as follows: determining a ratio of the sum of all the scores included in the score list to the total number of all the scores as the first score of the image emotion corresponding to the to-be-selected music.

FIG. 5 shows a flowchart of a method of determining a first score of image style corresponding to the to-be-selected music provided by an embodiment of the present application. As shown in FIG. 5, the method comprises:

S501: according to at least one first image style included in a style analysis result of the image style corresponding to the at least one image, at least one first music genre included in the music genre in the attribute information of the to-be-selected music and a prestored first predetermined list, determining a third score of the music genre corresponding to the image style.

The first predetermined list comprises a plurality of first image styles and a first music genre corresponding to each first image style. As an example, the first predetermined list has the format shown in Table 2 below.

TABLE 2

| Image style 1 | Music genre 1 | Music genre 2, music genre 3 | . . . |
| Image style 2 | Music genre 4 | Music genre1 | . . . |
| Image style 3 | Music genre 1 | Music genre 5 | . . . |
| Image style 4 | Music genre 5 | NULL | . . . |
| . . . | . . . | . . . | . . . |

In the first predetermined list, the number of first music genres corresponding to the first image styles may be multiple, may be 1, or may be 0. "NULL" indicates that there is no first music genre at this position. Each first music genre in the first predetermined list has a corresponding score, and when the first image style corresponds to a plurality of first music genres, the scores corresponding to the first music genres in a plurality of columns decrease in order (indicating that the match degrees of the first image style with the first music genres decrease in order). As an example, when the first image style is an image style 3, a music genre 1 located in the first column corresponds to a larger score, and a music genre 5 located in the second column corresponds to a smaller score. NULL corresponds to a score of zero.

In one possible design, for each first image style, a first music genre corresponding to the first image style is looked up in the first predetermined list; if the first music genre corresponding to the first image style exists among the at least one first music genre, a score of the found first music genre corresponding to the first image style is obtained; a sum of the scores of the found first music genres corresponding to the first image style is determined as the score of the music genre corresponding to the first image style; the maximum score among the scores of the music genre corresponding to each first image style is determined as the third score of the music genre corresponding to the image style.

Optionally, a sum of the scores of the music genre corresponding to each first image style may also be determined as the third score of the music genre corresponding to the image style.

As an example, when the at least one first image style comprises an image style 2 and an image style 3, for the image style 2, the first music genre corresponding to the image style 2 as found in the first predetermined list comprises a music genre 4 and a music genre 1, and if the at least one first music genre comprises the music genre 4, the music genre 1, the music genre 5 and the music genre 2, then it is determined that the at least one first music genre comprises the music genre 4 and the music genre 1 corresponding to the image style 2, so that a score corresponding to the music tune 4 and a score corresponding to the music genre 1 may be obtained, and a sum of the score corresponding to the music genre 4 and the score corresponding to the music genre 1 is determined as a score of the music genre corresponding to the image style 2; for the image style 3, the first music genre corresponding to the image style 3 as found in the first predetermined list comprises the music genre 5, and if the at least one first music genre includes the music genre 4, the music genre 1, the music genre 5 and the music genre 2, then it is determined that the at least one first music genre comprises the music tune 5 corresponding to the image style 3, and thus a score corresponding to the music genre 5 may be obtained and further determined as the score of the music genre corresponding to the image style 3; and furthermore, the larger one of the score of the music genre corresponding to the image style 2 and the score of the music genre corresponding to the image style 3 is determined as the third score of the music genre corresponding to the image style.

Optionally, a sum of the score of the music genre corresponding to the image style 2 and the score of the music genre corresponding to the image style 3 may also be determined as the third score of the music genre corresponding to the image style.

S502: according to the at least one first image style, the at least one first music emotion and a prestored second predetermined list, determining a fourth score of the music emotion corresponding to the image style.

The second predetermined list comprises the plurality of first image styles and a first music emotion corresponding to each first image style. As an example, the second predetermined list has the format shown in Table 3 below.

TABLE 3

| Image style 1 | Music emotion 1 | Music emotion 2 | . . . |
| Image style 2 | Music emotion 3 | Music emotion 4 | . . . |
| Image style 3 | Music emotion 4 | Music emotion 5 | . . . |
| Image style 4 | Music emotion 5 | NULL | . . . |
| Image style 5 | Music emotion 6 | Music emotion7 | . . . |
| . . . | . . . | . . . | . . . |

In the second predetermined list, the number of first music emotions corresponding to the first image style may be multiple, may be 1, or may be 0. "NULL" indicates that there is no first music emotion at the position. Each first music emotion in the second predetermined list has a corresponding score, and when the first image style corresponds to a plurality of first music emotions, the scores corresponding to the first music emotions in a plurality of columns decrease in order (indicating that the match degrees of the first image style with the first music emotions decrease in order). As an example, when the first image style is image style 4, the music genre 5 in the first column corresponds to a larger score, and NULL in the second column corresponds to a score of zero.

It is noteworthy that the execution method of S502 is similar to that of S501, and the execution process of S502 will not be repeated here.

S503: determining a sum of the third score and the fourth score as the first score of the to-be-selected music corresponding to the image style.

FIG. 6 shows a flowchart of a flowchart of determining a first score of the to-be-selected music corresponding to an image theme provided by an embodiment of the present application. As shown in FIG. 6, the method comprises:

S601: according to at least one first image theme included in the theme analysis result of the at least one image corresponding to the image style, at least one first music scene included in the music scene and a pre-stored third predetermined list, determining a fifth score of the music scene corresponding to the image theme.

The third predetermined list comprises a plurality of first image themes and a first music scene corresponding to each first image theme. As an example, the third predetermined list has the format shown in Table 4 below.

TABLE 4

| Image theme 1 | Music scene 1 | NULL | . . . |
| Image theme 2 | Music scene 3 | Music scene 2 | . . . |
| Image theme 3 | Music scene 4 | Music scene 5 | . . . |
| . . . | . . . | . . . | . . . |

In the third predetermined list, the number of first music scenes corresponding to the first image theme may be multiple, may be 1, or may be 0. "NULL" indicates that there is no first music scene at this position. Each first music scene in the third predetermined list has a corresponding score, and when the first image theme corresponds to a plurality of first music scenes, the scores corresponding to the first music scenes in a plurality of columns decrease in order (indicating that the match degrees of the first image theme and the first music scenes decrease in order). As an example, when the first image theme is the image theme 2, the music scene 3 in the first column corresponds to a larger score, and the music scene 2 in the second column corresponds to a smaller score.

It is noteworthy that the execution method of S601 is similar to that of S501, and the execution process of S601 will not be repeated here.

S602: based on the at least one first image theme included in the theme analysis result, the at least one first music emotion included in the music emotion and a prestored fourth predetermined list, determining a sixth score of the music emotion corresponding to the image theme.

The fourth predetermined list comprises a plurality of first image themes and a first music emotion corresponding to each first image theme. As an example, the fourth predetermined list has the format shown in Table 5 below.

TABLE 5

| Image theme 1 | Music emotion 1 | NULL | . . . |
| Image theme 2 | Music emotion 3 | Music emotion 2 | . . . |
| Image theme 3 | Music emotion 4 | Music emotion 5 | . . . |
| . . . | . . . | . . . | . . . |

In the fourth predetermined list, the number of first music emotions corresponding to the first image theme may be more, may be 1, or may be 0. "NULL" indicates that there is no first music emotion at this position. Each first music emotion in the fourth predetermined list has a corresponding score, and when the first image theme corresponds to a plurality of first music emotions, the scores corresponding to the first musical emotion in the plurality of columns decrease in order (indicating that the match degrees between the first image theme and the first music emotions decrease in order). As an example, when the first image theme is the image theme 2, the music emotion 3 in the first column corresponds to a larger score, and the music emotion 2 in the second column corresponds to a smaller score.

It is noteworthy that the execution method of S602 is similar to that of S501, and the execution process of S602 will not be repeated here.

S603: based on the at least one first image theme included in the theme analysis result, the at least one first music genre included in the music tune and a prestored fifth predetermined list, determining a seventh score of the music genre corresponding to the image theme determined.

The fifth predetermined list includes a plurality of first image themes and a first musical tune corresponding to each first image theme. Exemplarily, the fifth predetermined list has the format shown in Table 6 below.

TABLE 6

| Image theme 1 | Music genre 1 | NULL | . . . |
| Image theme 2 | Music genre 3 | Music genre 2 | . . . |
| Image theme 3 | Music genre 2 | NULL | . . . |
| . . . | . . . | . . . | . . . |

In the fifth predetermined list, the number of first music genres corresponding to the first image theme may be multiple, may be 1, or may be 0. "NULL" indicates that there is no first music genre at the position. Each first music genre in the fifth predetermined list has a corresponding score, and when the first image theme corresponds to a plurality of first music genres, the scores corresponding to the first music genres in a plurality of columns decrease in order (indicating that the match degrees between the first image theme and the first music genres decrease in order). As an example, when the first image theme is the image theme 1, the music genre 1 in the first column corresponds to a larger score, and NULL in the second column corresponds to a score of zero.

It is noteworthy that the execution method of S603 is similar to that of S501, and the execution process of S603 will not be repeated here.

S604: determining a sum of the fifth score, the sixth score and the seventh score as the first score of the to-be-selected music corresponding to the image theme.

On the basis of the embodiment of FIG. 4 above, a method of determining a correlation list is described below in connection with FIG. 7, by taking a correlation list including a plurality of correlation values corresponding to the first music emotion and the first image emotion as an example.

Figure 7:
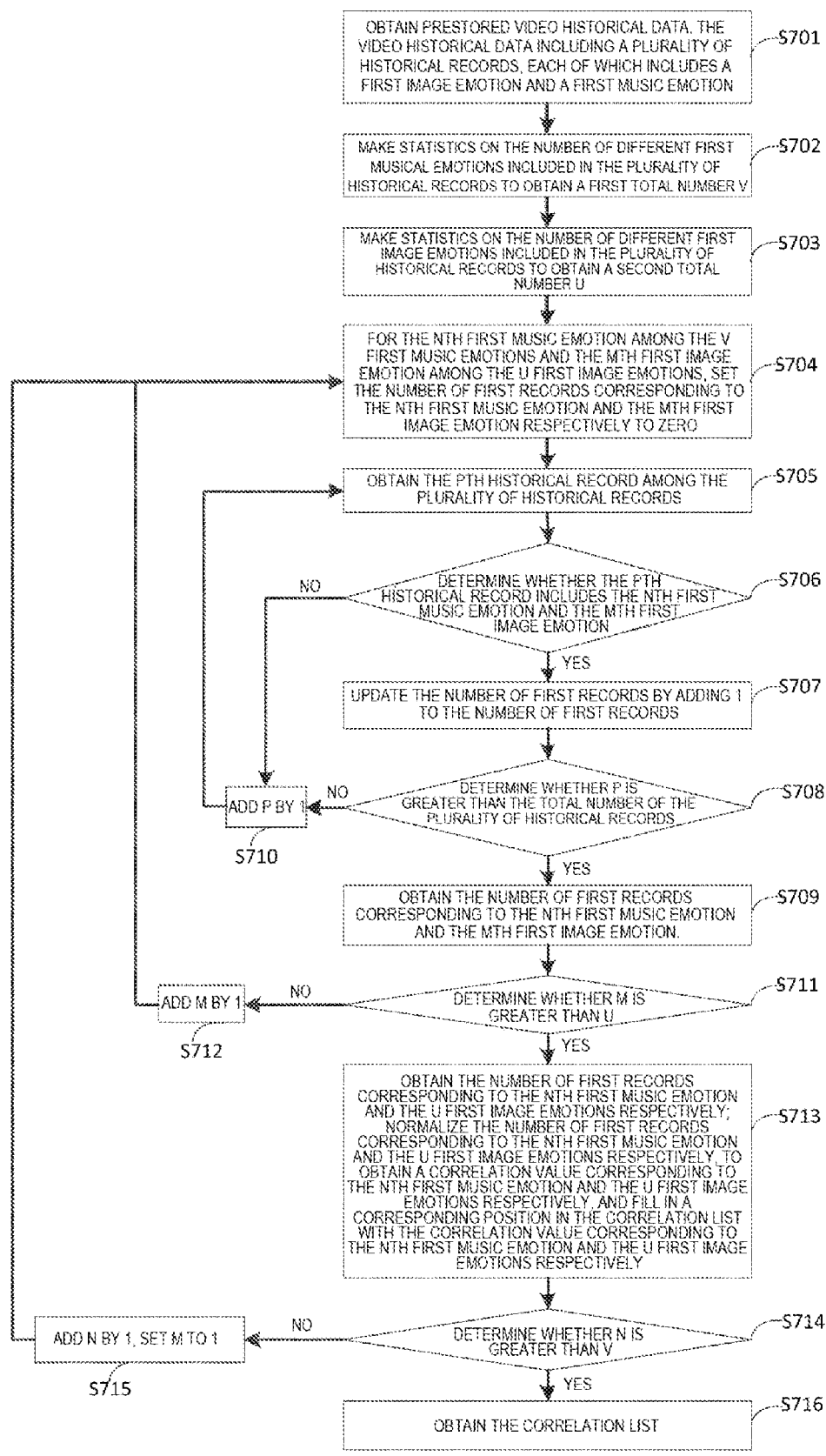
FIG. 7 shows a flowchart of determining a correlation list provided by embodiments of the present application.

FIG. 7 shows a flowchart of determining a correlation list provided by an embodiment of the present application. As shown in FIG. 7, the method comprises:

S701: obtaining prestored video historical data, the video historical data including a plurality of historical records, each of which includes a first image emotion and a first music emotion.

The first image emotion is an emotion of at least one historical image.

The first musical emotion is an emotion of a soundtrack of the at least one historical image.

S702: making statistics on the number of different first musical emotions included in the plurality of historical records to obtain a first total number V.

S703: making statistics on the number of different first image emotions included in the plurality of historical records to obtain a second total number U.

S704: for the nth first music emotion among the V first music emotions and the mth first image emotion among the U first image emotions, setting the number of first records corresponding to the nth first music emotion and the mth first image emotion respectively to zero. Initially, n and m are both equal to 1.

S705: obtaining the pth historical record among the plurality of historical records.

S706: determining whether the pth historical record includes the nth first music emotion and the mth first image emotion.

If yes, performing S707 to S709, otherwise performing S710.

S707: updating the number of first records by adding 1 to the first record number.

S708: determining whether p is greater than the total number of the plurality of historical records.

If yes, performing S709, otherwise performing S710.

S709: obtaining the number of first records corresponding to the nth first music emotion and the mth first image emotion.

S710: adding p by 1, and repeating S705~S709.

S711: determining whether m is greater than U.

If not, performing S712: if yes, performing S713~S716.

It is noteworthy that S711~S716 are performed after S709.

S712: adding m by 1 and repeating S704~S711.

S713: obtaining the number of first records corresponding to the nth first music emotion and the U first image emotions respectively: normalizing the number of first records corresponding to the nth first music emotion and the U first image emotions respectively, to obtain a correlation value corresponding to the nth first music emotion and the U first image emotions respectively, and filling in a corresponding position in the correlation list with the correlation value corresponding to the nth first music emotion and the U first image emotions respectively.

Specifically, a sum value of the number of first records corresponding to the nth first music emotion and the U first image emotions respectively is determined; and a ratio of the number of first records corresponding to the target music emotion and the U first image emotions respectively to the above sum value is determined as the correlation value corresponding to the nth first music emotion and the U first image emotions respectively.

S714: determining whether n is greater than V.

If not, performing S715, otherwise performing S716.

S715: adding n by 1, setting m to 1, and repeating S704~S714.

S716: obtaining the correlation list.

It is noteworthy that after obtaining the correlation list according to the method shown in the embodiment of FIG. 7, the obtained correlation list may be directly determined as the correlation list in the embodiment of FIG. 4, and the developer further manually adjusts the correlation values in the obtained correlation list and determines the manually adjusted correlation list as the correlation list in the embodiment of FIG. 4.

Figure 8:
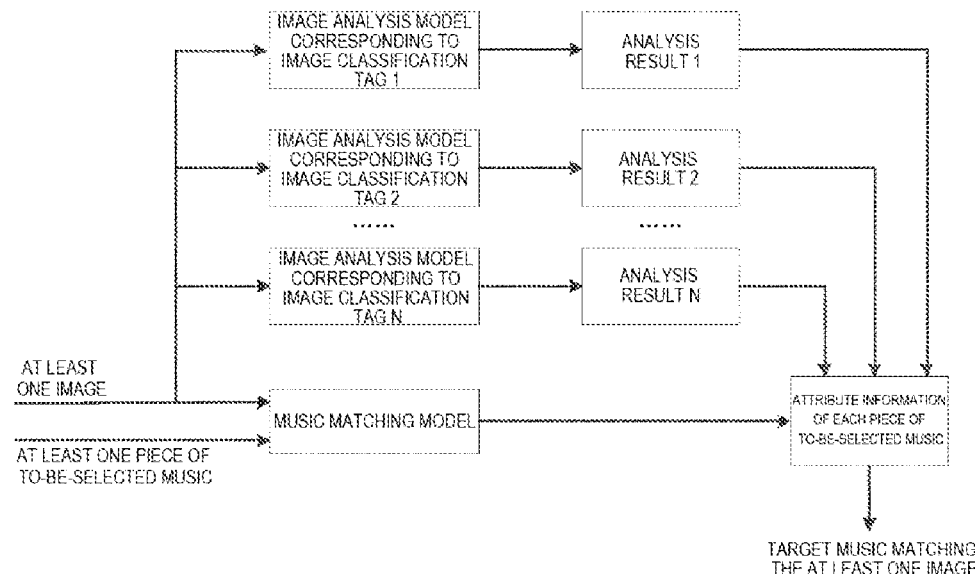
FIG. 8 is a flow block diagram of a music screening method provided by embodiments of the present application.

FIG. 8 shows a flow block diagram of a music screening method provided by an embodiment of the present application. As shown in FIG. 8, there is comprised: respective image analysis models corresponding to the N image classification tags, and a music matching model. Wherein, the respective image analysis model corresponding to the N image classification tags comprise: an image analysis model corresponding to an image classification tag 1, an image analysis model corresponding to an image classification tag 2, . . . , and an image analysis model corresponding to an image classification tag N.

The respective image analysis models corresponding to the N image classification tags analyze and process the at least one image to obtain an analysis result for the at least one image corresponding to the image classification tag. For example, the at least one image is analyzed and processed by the image analysis model corresponding to the image classification tag 1 to obtain an analysis result 1 of the at least one image corresponding to the image classification tag; the at least one image is analyzed and processed by the image analysis model corresponding to the image classification tag 2 to obtain an analysis result 2 of the at least one image corresponding to the image classification tag.

The music matching model processes the at least one image and the at least one piece of to-be-selected music to obtain the attribute information of each piece of to-be-selected music.

Further, the target music matching the at least one image is determined with reference to the N analysis results and the attribute information of each piece of to-be-selected music.

Figure 9:
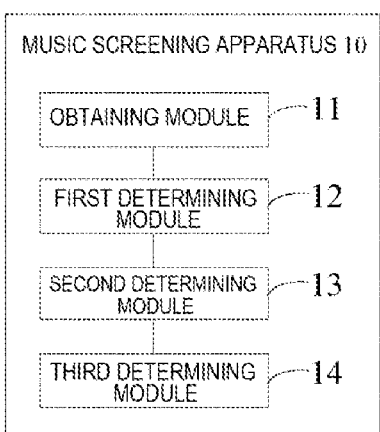
FIG. 9 shows a structural schematic diagram of a music screening apparatus provided by embodiments of the present application.

FIG. 9 shows a structural schematic diagram of a music screening apparatus provided by an embodiment of the present application. As shown in FIG. 9, a music screening apparatus 10 comprises: an obtaining module 11, a first determining module 12, a second determining module 13 and a third determining module 14; wherein the obtaining module 11 is used to obtain at least one image and at least one piece of to-be-selected music;

the first determining module 12 is used to, according to predetermined N image classification tags, determine an analysis result of the at least one image corresponding to the image classification tag, N being an integer greater than or equal to 1;

the second determining module 13 is used to determine attribute information for each piece of to-be-selected music according to the at least one image and the at least one piece of to-be-selected music;

the third determining module 14 is used to determine target music that matches the at least one image among the at least one piece of to-be-selected music according to the analysis result and the attribute information of each piece of to-be-selected music.

The music screening apparatus 10 provided by the embodiments of the present application may perform music screening described above, with similar implementation principles and beneficial effects, which will not be repeated herein.

In one possible design, the third determining module 14 is specifically used to: determine a target score of the at least one piece of to-be-selected music according to the analysis result and the attribute information of each piece of to-be-selected music; obtain a music sequence by ranking the at least one piece to-be-selected music in an order of the target scores of the at least one piece of to-be-selected music; and determine a predetermined number of pieces of to-be-selected music ranking at the top of the music sequence as the target music that matches the at least one image.

In one possible design, the third determining module 14 is specifically used to: for each piece of to-be-selected music, determine a first score of the to-be-selected music corresponding to each image classification tag according to the analysis result and the attribute information of the to-be-selected music; obtain respective corresponding weights of the N image classification tags; and determine a target score of the to-be-selected music according to the first score of the to-be-selected music corresponding to each image classification tag, the respective corresponding weights of the N image classification tags and an initial score of the to-be-selected music, the initial score of the to-be-selected music being included in the attribute information of the to-be-selected music.

In one possible design, the N image classification tags comprise at least one of: an image emotion, an image style, or an image theme; the attribute information further comprises M music classification tags of the to-be-selected music, M being an integer greater than or equal to 1; and the M music classification tags comprise at least one of: a music style, a music emotion, or a music scene.

In one possible design, the analysis result is an emotion analysis result of the at least one image corresponding to the image emotion, the emotion analysis result comprising at least one first image emotion and a confidence level of the at least one first image emotion; the attribute information comprises a music emotion of the to-be-selected music, the music emotion comprising the at least one first music emotion;

the third determining module 14 is specifically used to: determine a score of the at least one first music emotion corresponding to the image emotion according to the at least one first image emotion, the confidence level of the at least one first image emotion and the at least one first music emotion; and determine a ratio of a sum of the scores of the at least one first music emotion corresponding to the image emotion to a total number of emotions of the at least one first music emotion as a first score of the to-be-selected music corresponding to the image emotion.

In one possible design, the third determining module 14 is specifically used to:

in step 1: obtain an ith first music emotion of the at least one first music emotion; in step 2: obtain an jth first image emotion of the at least one first image emotion;

in step 3: look up an jth correlation value corresponding to the ith first music emotion and the jth first image emotion in a prestored correlation list; the correlation list comprising a plurality of correlation values corresponding to the first music emotion and the first image emotion;

in step 4: determine a sum of a product of the jth correlation value and the confidence level of the jth first image emotion and a (j−1)th score of the jth first music emotion corresponding to an (j−1)th first image emotion as an jth score of the ith first music emotion corresponding to the jth first image emotion;

add j by 1 and repeat steps 2, 3, and 4 until j is equal to Y, to obtain a Yth score of the ith first music emotion corresponding to the Yth first image emotion;

determine a ratio of the Yth score to a sum of the confidence levels of the at least one first image emotion as a score of the ith first music emotion corresponding to the image emotion;

i is an integer between 1 and X, j is an integer between 1 and Y, X is a total number of emotions of the at least one first music emotion, and Y is a total number of emotions of the at least one first image emotion.

In one possible design, the analysis result is a style analysis result of the at least one image corresponding to the image style, the style analysis result comprising at least one first image style; the attribute information comprises a music emotion and a music genre of the to-be-selected music, the music genre comprising at least one first music genre, and the music emotion comprising at least one first music emotion;

the third determining module 14 is specifically used to: determine a third score of the music genre corresponding to the image style according to the at least one first image style, the at least one first music genre and a prestored first predetermined list; the first predetermined list comprising a plurality of first image styles and a first music genre corresponding to each first image style; determine a fourth score of the music emotion corresponding to the image style according to at least one first image style, the at least one first music emotion and a prestored second predetermined list; the second predetermined list comprising first image styles and a first music emotion corresponding to each first image style; determine a sum of the third score and the fourth score as a first score of the to-be-selected music corresponding to the image style.

In one possible design, the third determining module 14 is specifically used to: for each first image style, look up a first music genre corresponding to the first image style in the first predetermined list; if the found first music genre corresponding to the first image style exists among the at least one first music genre, obtain a score of the found first music genre corresponding to the first image style; determine a sum of the scores of the found first music genre corresponding to the first image style as a score of the music genre corresponding to the first image style; and determine the largest one among the scores of the music genre corresponding to each of the first image styles as a third score of the music genre corresponding to the image style.

In one possible design, the analysis result is a theme analysis result of the at least one image corresponding to the image theme, the theme analysis result comprising at least one first image theme; the attribute information comprises a music scene, a music emotion and a music genre of to-be-selected music, the music scene comprising at least one first music scene, the music emotion comprising at least one first music emotion, and the music genre comprising at least one first music genre;

The third determining module 14 is specifically used to: determine a fifth score of the music scene corresponding to the image theme according to the at least one first image theme, the at least one first music scene, and a prestored third predetermined list; the third predetermined list comprising a plurality of first image themes and a first music scene corresponding to each first image style; determine a sixth score of the music emotion corresponding to the image theme according to the at least one first image theme, the at least one first music emotion and a prestored fourth predetermined list; the fourth predetermined list comprising a plurality of first image themes and a first music emotion corresponding to each first image style; determine a seventh score of the music genre corresponding to the image theme according to the at least one first image theme, the at least one first music genre and a prestored fifth predetermined list; the fifth predetermined list comprising a plurality of first image themes and a first music genre corresponding to each first image style; and determine a sum of the fifth score, the sixth score and the seventh score as a first score of the to-be-selected music corresponding to the image theme.

In a possible design, the third determining module 14 is specifically used to: for each image classification tag, determine a product of a first score of the to-be-selected music corresponding to each image classification tag and a weight corresponding to the image classification tag to obtain a first product corresponding to the image classification tag; and determine a sum of the first product corresponding to the N image classification tags and the initial score of the to-be-selected music as a target score of the to-be-selected music.

In one possible design, the first determining module 11 is specifically used to: analyze and process the at least one image according to the predetermined N image classification tags and with respective image analysis models corresponding to the N image classification tags, to obtain an analysis result of the at least one image corresponding to the image classification tag; the respective image analysis models corresponding to the N image classification tags are obtained by training respective plurality of sample images corresponding to the N image classification tags.

In one possible design, the second determining module 12 is specifically used to: process the at least one image and each piece of to-be-selected music with a pre-trained music matching model, to obtain the attribute information of each piece of to-be-selected music, the music matching model being obtained by training a plurality of sample images and a plurality of pieces of sample music.

The music screening apparatus 10 provided by the embodiments of the present application may perform music screening described above, with similar implementation principles and beneficial effects, which will not be repeated herein.

Figure 10:
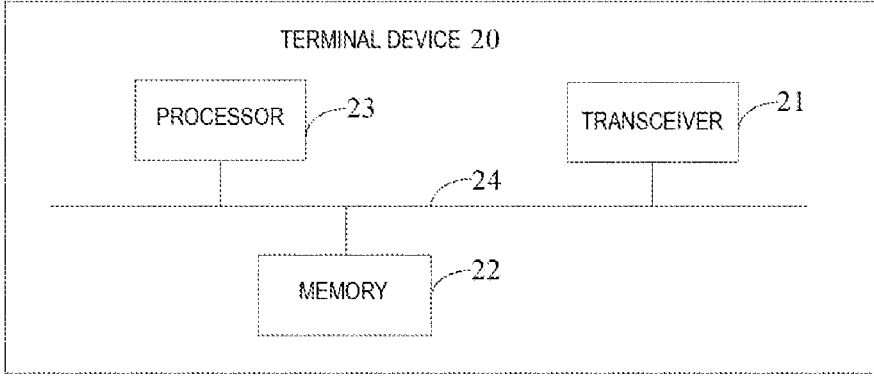
FIG. 10 shows a hardware schematic diagram of a terminal device provided by embodiments of the present application.

FIG. 10 shows a hardware schematic diagram of a terminal device provided by an embodiment of the present application. As shown in FIG. 10, a terminal device 20 may comprise: a transceiver 21, a memory 22, and a processor 23.

The transceiver 21 may comprise: a transmitter and/or a receiver.

The transmitter may also be referred to as a sender, a send port, or a send interface, and other similar descriptions.

The receiver may also be referred to as a receive port, or a receive interface, and similar descriptions.

As an example, the transceiver 21, the memory 22 and the processor 23 are interconnected by a bus 24.

The memory 22 is used to store computer-executed instructions;

the processor 23 is used to execute the computer-executed instructions stored in the memory 22, causing the processor 23 to perform the music screening method described above.

An embodiment of the present application provides a computer-readable storage medium, on which computer-executed instructions are stored, the computer-executed instructions, when executed by a processor, performing the music screening method of any of the above method embodiments.

An embodiment of the present application provides a computer program product comprising a computer program which, when executed by a processor, performs the music screening method of any of the above method embodiments.

An embodiment of the present application provides a computer program which, when executed by a processor, performs the music screening method of any of the above method embodiments.

All or part of the steps of implementing each of the above method embodiments may be implemented by hardware related to the program instructions. The foregoing program may be stored in a readable memory. The program, when executed, performs the steps comprising each of the above-described method embodiments; and the foregoing memory (storage medium) includes: read-only memory (ROM), random access memory (RAM), flash memory, a hard disk, a solid state disk, a magnetic tape, a floppy disk, an optical disk, and any combination thereof.

The embodiments of the present application have been described with reference to flowcharts and/or block diagrams of methods, devices (systems), and computer program products according to the embodiments of the present application. It is to be understood that each of the processes and/or blocks in the flowchart and/or block diagram and combinations of the processes and/or blocks in the flowchart and/or block diagram may be implemented by computer program instructions. These computer program instructions may be provided to a processing unit of a general-purpose computer, a special-purpose computer, an embedded processor, or other programmable data processing device to produce a machine such that the instructions executed by the processing unit of the computer or other programmable data processing device produce means for carrying out the functions specified in the one or more processes of the flowchart and/or the one or more blocks of the block diagram.

These computer program instructions may also be stored in a computer-readable memory capable of guiding a computer or other programmable data processing device to operate in a particular manner, such that the instructions stored in the computer-readable memory produce an artifact comprising an instruction device that implements the functions specified in one or more processes of the flowchart and/or one or more blocks of the block diagram.

These computer program instructions may also be loaded onto a computer or other programmable data processing device such that a series of operational steps are performed on the computer or other programmable device to produce computer-implemented processing, such that the instructions executed on the computer or other programmable device provide steps for implementing the functions specified in one or more processes of the flowchart and/or one or more blocks of the block diagram.

Obviously, those skilled in the art may make various changes and variations to the embodiments of the present application without departing from the spirit and scope of the present application. Thus, if such changes and variations to the embodiments of the present application fall within the scope of the claims of the present application and their technical equivalents, the present application is intended to encompass such changes and variations as well.

In the present application, the term "comprise" and its variants may refer to a non-limiting inclusion; the term "or" and its variants may refer to "and/or." The terms "first," "second" and the like used herein are used to distinguish similar objects and not necessarily used to describe a particular order or sequence. In the present application, "a plurality of" means two or more. "And/or," which describes an association relationship between associated objects, indicates that there may exist three types of relationships, e.g., A and/or B may indicate the three cases of: the existence of A alone, the existence of both A and B, and the existence of B alone. The character "/" generally indicates an "or" relationship between associated objects. For example, "A, B or C" or "A, B and/or C" means "any of: A; B; C; A and B; A and C; B and C; A. B and C."

What is claimed is:

1. A method of music screening for automatic soundtrack generation in a video editing system, comprising:

obtaining, by a processor, at least one image and at least one piece of to-be-selected music;

determining, by an image analysis model, an analysis result of the at least one image corresponding to an image classification tag based on N predetermined image classification tags, N being an integer greater than or equal to 1;

determining, by a music matching model, attribute information for each of the at least one piece of to-be-selected music based on the at least one image and the at least one piece of to-be-selected music; and determining, by the processor, a target music that matches the at least one image among the at least one piece of to-be-selected music based on the analysis result obtained from the image analysis model and the attribute information of each of the at least one piece of to-be-selected music obtained from the music matching model;

wherein the determining the target music that matches the at least one image among the at least one piece of to-be-selected music comprises:

for a piece of music of the at least one piece of to-be-selected music, determining at least one first score of the piece of music corresponding to at least one image classification tag based on the analysis result and the attribute information of the piece of music;

determining, by the processor, a target score of the piece of music based on the at least one first score corresponding to the at least one image classification tag and an initial score of the piece of music, the initial score of the piece of music being included in the attribute information of the piece of music, comprising:

obtaining, by the processor, respective weights of the N image classification tags, the weights being preset and periodically updated based on accumulated matching data; and determining, by the processor, the target score of the piece of music based on N first scores corresponding to the N image classification tags, the respective weights of the N image classification tags and the initial score of the piece of music; and determining, by the processor, the target music based on at least one respective target score of the at least one piece of to-be-selected music, comprising:

obtaining, by the processor, a music sequence by ranking the at least one piece of to-be-selected music in an order of the at least one respective target score of the at least one piece of to-be-selected music; and determining, by the processor, a predetermined number of pieces of to-be-selected music ranking at a top of the music sequence as the target music that matches the at least one image, and automatically inserting the target music as a synchronized soundtrack into a user-generated video comprising the at least one image.

2. The method according to claim 1, wherein the N image classification tags comprise at least one of: an image emotion, an image style, or an image theme; the attribute information further comprises M music classification tags of the to-be-selected music, M being an integer greater than or equal to 1; and the M music classification tags comprise at least one of: a music style, a music emotion, or a music scene.

3. The method according to claim 2, wherein the analysis result is an emotion analysis result of the at least one image corresponding to the image emotion, the emotion analysis result comprising at least one first image emotion and a confidence level of the at least one first image emotion; the attribute information comprises a music emotion of the to-be-selected music, the music emotion comprising the at least one first music emotion;

the determining a first score of the to-be-selected music corresponding to the image emotion based on the emotion analysis result and the music emotion comprises:

determining a score of the at least one first music emotion corresponding to the image emotion according to the at least one first image emotion, the confidence level of the at least one first image emotion and the at least one first music emotion; and determining a ratio of a sum of the scores of the at least one first music emotion corresponding to the image emotion to a total number of emotions of the at least one first music emotion as a first score of the to-be-selected music corresponding to the image emotion.

4. The method according to claim 3, wherein the determining a score of the at least one first music emotion corresponding to the image emotion based on the at least one first image emotion, the confidence level of the at least one first image emotion and the at least one first music emotion comprises:

step 1: obtaining an ith first music emotion of the at least one first music emotion;

step 2: obtaining a jth first image emotion of the at least one first image emotion;

step 3: looking up a jth correlation value corresponding to the ith first music emotion and the jth first image emotion in a prestored correlation list; the correlation list comprising a plurality of correlation values corresponding to the first music emotion and the first image emotion;

step 4: determining a sum of a product of the jth correlation value and the confidence level of the jth first image emotion and a $(j-1)$th score of the jth first music emotion corresponding to a $(j-1)$th first image emotion as a jth score of the ith first music emotion corresponding to the jth first image emotion;

adding j by 1 and repeating steps 2, 3, and 4 until j is equal to Y, to obtain a Yth score of the ith first music emotion corresponding to the Yth first image emotion; and determining a ratio of the Yth score to a sum of the confidence levels of the at least one first image emotion as a score of the ith first music emotion corresponding to the image emotion, wherein i is an integer between 1 and X, j is an integer between 1 and Y, X is a total number of emotions of the at least one first music emotion, and Y is a total number of emotions of the at least one first image emotion.

5. The method according to claim 2, wherein the analysis result is a style analysis result of the at least one image corresponding to the image style, the style analysis result comprising at least one first image style, the attribute information comprises a music emotion and a music genre of the to-be-selected music, the music genre comprising at least one first music genre, and the music emotion comprising at least one first music emotion, the determining a first score of the to-be-selected music corresponding to the image style based on the style analysis result, the music emotion and the music genre comprises:

determining a third score of the music genre corresponding to the image style based on the at least one first image style, the at least one first music genre and a prestored first predetermined list; the first predetermined list comprising a plurality of first image styles and a first music genre corresponding to each first image style;

determining a fourth score of the music emotion corresponding to the image style based on at least one first image style, the at least one first music emotion and a prestored second predetermined list; the second predetermined list comprising first image styles and a first music emotion corresponding to each first image style; and determining a sum of the third score and the fourth score as a first score of the to-be-selected music corresponding to the image style.

6. The method according to claim 5, wherein the determining a third score of the music genre corresponding to the image style based on the at least one first image style, the at least one first music genre and a prestored first predetermined list comprises:

for each first image style, looking up a first music genre corresponding to the first image style in the first predetermined list;

if a found first music genre corresponding to the first image style exists among the at least one first music genre, obtaining a score of the found first music genre corresponding to the first image style;

determining a sum of the scores of the found first music genre corresponding to the first image style as a score of the music genre corresponding to the first image style; and determining a largest one among the scores of the music genre corresponding to each of the first image styles as a third score of the music genre corresponding to the image style.

7. The method according to claim 2, wherein the analysis result is a theme analysis result of the at least one image corresponding to the image theme, the theme analysis result comprising at least one first image theme, the attribute information comprises a music scene, a music emotion and a music genre of to-be-selected music, the music scene comprising at least one first music scene, the music emotion comprising at least one first music emotion, and the music genre comprising at least one first music genre, the determining a first score of the to-be-selected music corresponding to the image theme based on the theme analysis result, the music scene, the music emotion and the music genre comprises:

determining a fifth score of the music scene corresponding to the image theme based on the at least one first image theme, the at least one first music scene, and a prestored third predetermined list; the third predetermined list comprising a plurality of first image themes and a first music scene corresponding to each first image style;

determining a sixth score of the music emotion corresponding to the image theme based on the at least one first image theme, the at least one first music emotion and a prestored fourth predetermined list; the fourth predetermined list comprising a plurality of first image themes and a first music emotion corresponding to each first image style;

determining a seventh score of the music genre corresponding to the image theme based on the at least one first image theme, the at least one first music genre and a prestored fifth predetermined list; the fifth predetermined list comprising a plurality of first image themes and a first music genre corresponding to each first image style; and determining a sum of the fifth score, the sixth score and the seventh score as a first score of the to-be-selected music corresponding to the image theme.

8. The method according to claim 1, wherein the determining the target score of the piece of music based on N first scores corresponding to the N image classification tags, respective weights corresponding to the N image classification tags and an initial score of the piece of music comprises:

for each image classification tag, determining a product of a first score of the to-be-selected music corresponding to each image classification tag and a weight corresponding to the image classification tag to obtain a first product corresponding to the image classification tag; and determining a sum of the first product corresponding to the N image classification tags and the initial score of the to-be-selected music as a target score of the to-be-selected music.

9. The method according to claim 1, wherein the determining an analysis result of the at least one image corresponding to the image classification tag based on the predetermined N image classification tags comprises:

analyzing and processing the at least one image based on the predetermined N image classification tags and with respective image analysis models corresponding to the N image classification tags, to obtain an analysis result of the at least one image corresponding to the image classification tag, wherein the respective image analysis models corresponding to the N image classification tags are obtained by training a respective plurality of sample images corresponding to the N image classification tags.

10. The method according to claim 1, wherein the determining attribute information of each of the at least one piece of to-be-selected music based on the at least one image and the at least one piece of to-be-selected music comprises:

processing the at least one image and each of the at least one piece of to-be-selected music with a pre-trained music matching model, to obtain the attribute information of each of the at least one piece of to-be-selected music, the music matching model being obtained by training a plurality of sample images and a plurality of pieces of sample music.

11. The method according to claim 1, wherein the obtaining at least one image comprises:

obtaining at least one frame of image from at least one to-be-processed video and determining the at least one frame of image as the at least one image; or obtaining at least one frame of image from at least one to-be-processed video and determining the at least one frame of image and a prestored image as the at least one image.

12. A terminal device, comprising:

a processor and a memory; the memory storing computer-executed instructions;

the processor executing the computer-executed instructions stored in the memory, causing the processor to perform a method of music screening for automatic soundtrack generation in a video editing system, the method comprising:

obtaining at least one image and at least one piece of to-be-selected music;

determining, by an image analysis model, an analysis result of the at least one image corresponding to an image classification tag based on N predetermined image classification tags, N being an integer greater than or equal to 1;

determining, by a music matching model, attribute information for each of the at least one piece of to-be-selected music based on the at least one image and the at least one piece of to-be-selected music; and determining a target music that matches the at least one image among the at least one piece of to-be-selected music based on the analysis result obtained from the image analysis model and the attribute information of each of the at least one piece of to-be-selected music obtained from the music matching model;

wherein the determining the target music that matches the at least one image among the at least one piece of to-be-selected music comprises:

for a piece of music of the at least one piece of to-be-selected music, determining at least one first score of the piece of music corresponding to at least one image classification tag based on the analysis result and the attribute information of the piece of music;

determining a target score of the piece of music based on the at least one first score corresponding to the at least one image classification tag and an initial score of the piece of music, the initial score of the piece of music being included in the attribute information of the piece of music, comprising:

obtaining, by the processor, respective weights of the N image classification tags, the weights being preset and periodically updated based on accumulated matching data; and determining, by the processor, the target score of the piece of music based on N first scores corresponding to the N image classification tags, the respective weights of the N image classification tags and the initial score of the piece of music; and determining the target music based on at least one respective target score of the at least one piece of to-be-selected music, comprising:

obtaining, by the processor, a music sequence by ranking the at least one piece of to-be-selected music in an order of the at least one respective target score of the at least one piece of to-be-selected music; and determining, by the processor, a predetermined number of pieces of to-be-selected music ranking at a top of the music sequence as the target music that matches the at least one image, and automatically inserting the target music as a synchronized soundtrack into a user-generated video comprising the at least one image.

13. The device according to claim 12, wherein the N image classification tags comprise at least one of: an image emotion, an image style, or an image theme; the attribute information further comprises M music classification tags of the to-be-selected music, M being an integer greater than or equal to 1; and the M music classification tags comprise at least one of: a music style, a music emotion, or a music scene.

14. The device according to claim 13, wherein the analysis result is an emotion analysis result of the at least one image corresponding to the image emotion, the emotion analysis result comprising at least one first image emotion and a confidence level of the at least one first image emotion; the attribute information comprises a music emotion of the to-be-selected music, the music emotion comprising the at least one first music emotion, the determining a first score of the to-be-selected music corresponding to the image emotion based on the emotion analysis result and the music emotion comprises:

determining a score of the at least one first music emotion corresponding to the image emotion according to the at least one first image emotion, the confidence level of the at least one first image emotion and the at least one first music emotion; and determining a ratio of a sum of the scores of the at least one first music emotion corresponding to the image emotion to a total number of emotions of the at least one first music emotion as a first score of the to-be-selected music corresponding to the image emotion.

15. The device according to claim 14, wherein the determining a score of the at least one first music emotion corresponding to the image emotion based on the at least one first image emotion, the confidence level of the at least one first image emotion and the at least one first music emotion comprises:

step 1: obtaining an ith first music emotion of the at least one first music emotion;

step 2: obtaining a jth first image emotion of the at least one first image emotion;

step 3: looking up a jth correlation value corresponding to the ith first music emotion and the jth first image emotion in a prestored correlation list; the correlation list comprising a plurality of correlation values corresponding to the first music emotion and the first image emotion;

step 4: determining a sum of a product of the jth correlation value and the confidence level of the jth first image emotion and a $(j-1)$th score of the jth first music emotion corresponding to a $(j-1)$th first image emotion as a jth score of the ith first music emotion corresponding to the jth first image emotion;

adding j by 1 and repeating steps 2, 3, and 4 until j is equal to Y, to obtain a Yth score of the ith first music emotion corresponding to the Yth first image emotion; and determining a ratio of the Yth score to a sum of the confidence levels of the at least one first image emotion as a score of the ith first music emotion corresponding to the image emotion, wherein i is an integer between 1 and X, j is an integer between 1 and Y, X is a total number of emotions of the at least one first music emotion, and Y is a total number of emotions of the at least one first image emotion.

16. A non-transitory computer-readable storage medium, wherein computer-executed instructions are stored in the computer-readable storage medium, the computer-executed instructions, when executed by a processor, performing a method of music screening for automatic soundtrack generation in a video editing system, the method comprising:

obtaining, by a processor, at least one image and at least one piece of to-be-selected music;

determining, by an image analysis model, an analysis result of the at least one image corresponding to an image classification tag based on N predetermined image classification tags, N being an integer greater than or equal to 1;

determining, by a music matching model, attribute information for each of the at least one piece of to-be-selected music based on the at least one image and the at least one piece of to-be-selected music; and determining, by the processor, a target music that matches the at least one image among the at least one piece of to-be-selected music based on the analysis result obtained from the image analysis model and the attribute information of each of the at least one piece of to-be-selected music obtained from the music matching model;

wherein the determining the target music that matches the at least one image among the at least one piece of to-be-selected music comprises:

for a piece of music of the at least one piece of to-be-selected music, determining at least one first score of the piece of music corresponding to at least one image classification tag based on the analysis result and the attribute information of the piece of music;

determining, by the processor, a target score of the piece of music based on the at least one first score corresponding to the at least one image classification tag and an initial score of the piece of music, the initial score of the piece of music being included in the attribute information of the piece of music, comprising:

obtaining, by the processor, respective weights of the N image classification tags, the weights being preset and periodically updated based on accumulated matching data; and determining, by the processor, the target score of the piece of music based on N first scores corresponding to the N image classification tags, the respective weights of the N image classification tags and the initial score of the piece of music; and determining, by the processor, the target music based on at least one respective target score of the at least one piece of to-be-selected music, comprising:

obtaining, by the processor, a music sequence by ranking the at least one piece of to-be-selected music in an order of the at least one respective target score of the at least one piece of to-be-selected music; and determining, by the processor, a predetermined number of pieces of to-be-selected music ranking at a top of the music sequence as the target music that matches the at least one image, and automatically inserting the target music as a synchronized soundtrack into a user-generated video comprising the at least one image.

* * * * *